United States Patent [19]

Langer

[11] 3,959,096

[45] May 25, 1976

[54] ELECTROCHEMICAL RECOVERY OF COPPER FROM ALLOY SCRAP

[76] Inventor: Stanley H. Langer, 746 W. Main, Apt. No. 302, Madison, Wis. 53715

[22] Filed: Jan. 17, 1975

[21] Appl. No.: 542,079

[52] U.S. Cl. .............................. 204/107; 204/140; 204/146
[51] Int. Cl.² .......................................... C25C 1/12
[58] Field of Search ..................... 204/107, 146, 140

[56] References Cited
UNITED STATES PATENTS

| | | | |
|---|---|---|---|
| 507,130 | 10/1893 | Hoepfner | 204/107 |
| 556,092 | 3/1896 | Frölich | 204/111 |
| 714,861 | 12/1902 | Browne | 204/107 |
| 720,235 | 2/1903 | Frasch | 204/107 |
| 1,757,047 | 5/1930 | Hosenfeld | 204/107 |
| 1,817,527 | 8/1931 | Schlotter | 204/107 |
| 3,673,061 | 6/1972 | Kruesi | 204/105 |
| 3,692,647 | 9/1972 | Chambers | 204/105 |
| 3,707,448 | 12/1972 | Veloso | 204/96 |
| 3,776,826 | 12/1973 | Atadan | 204/107 |

OTHER PUBLICATIONS

Report of Investigation 7474, U.S. Dept of the Interior, Bureau of Mines.

*Primary Examiner*—R. L. Andrews
*Attorney, Agent, or Firm*—Thomas M. Meshbesher

[57] ABSTRACT

In the disclosed process, relatively pure copper is efficiently recovered from metallic alloy, scrap or cement, by electrochemical dissolution and deposition (as the relatively pure copper) under special conditions. In a halide solution, in a cell free from oxygen, the contaminated or alloyed copper is transferred from the impure state and separated by means of a substantially one electron process for the copper involved. The process can be operated in a one-fluid, or a two-fluid cell with diaphragm, depending on the composition of alloy or metal to be purified. For instance, in the case of copper-zinc alloys or mixtures, the copper is readily recovered in a one-fluid cell by suitable arrangement. Particularly with more complex alloys or mixtures, however, it can be advantageous to use a two-fluid cell and an intermediate purification stage between direct dissolution and electrodeposition. Concomitant metals may be recovered in either the metallic state or as chemical compounds. The process allows an orderly, effective electrochemical treatment for the recovery of copper in the presence of impurities.

20 Claims, No Drawings

3,959,096

ELECTROCHEMICAL RECOVERY OF COPPER FROM ALLOY SCRAP

CROSS-REFERENCE TO RELATED APPLICATIONS

U.S. Ser. No. 511,358, filed Oct. 2, 1974 (Stanley H. Langer et al.), entitled Electrolytic Cementation Process and Method contains a disclosure of a method for recovering high purity copper from a chemical primary cell-like arrangement which can be designed to exclude oxygen from the electrochemical system.

FIELD OF THE INVENTION

This invention relates to the recovery of copper from copper alloys (e.g. brasses, bronzes, aluminum solders, alclad, lynite, ampco metal, etc.) and other impure forms of metallic copper, e.g. copper cement. An aspect of this invention relates to the recovery of copper by electrochemical hydrometallurgical means, preferably in processes wherein an electromotive force is applied to the hydrometallurgical electrochemical cell.

DESCRIPTION OF THE PRIOR ART

There are dozens, perhaps hundreds, of uses for alloys containing copper. Merely by way of example, such uses include coinage metal, solder, alloys for special electrical or magnetic uses, fittings for nautical use, plumbing appliances and fittings (and other structural fittings), bullet or shell casings, machine parts, and the like. Each one of these uses can have different physical requirements, corrosion resistance requirements, and the like. Accordingly, at least since the days of antiquity when bronze was discovered, scientists, technicians, and artisans have developed an almost bewildering variety of alloys of copper with metals such as zinc, aluminum, iron, nickel, lead, tin, manganese, antimony, and the like. Copper has also been alloyed with precious and noble metals such as silver, gold, and palladium. Even particular types of alloys such as brasses and bronzes are generic terms including numerous different alloys such as gun metal bronze, bearing bronze, hardware bronze, aluminum bronzes, manganese bronze, and red brass, yellow brass, etc. Other commonly used copper alloys include alclad, lynite, ampco metal, manganin, magnetic alloy, ambrac, muntz metal, white metal, aluminum solder, white solder, easily fusible solder, battery plate, nickel coinage metal, and so-called nickel silver and German silver (which are actually alloys of copper, zinc, and nickel). Other forms of impure metallic copper (as opposed to ores, salts, oxides, etc.) are common. For example, copper is recovered from many processes by chemical displacement to give a copper cement which is typically less than 98% by weight copper.

Due to the almost endless variety of copper alloys, it is difficult to know, much less control, the composition of copper alloy scrap. For example, the typical scrap shop or metal working or fabricating shop produces or obtains vast quantities of brass turnings, metal pipe, wires, vessels, or the like. There is no guarantee that any two turnings in some huge pile of brass turnings will contain the same relative amounts of copper and zinc. Accordingly, sintering or melting the copper alloy scrap is likely to produce some new alloy of uncontrolled copper content.

A more workable method for utilizing copper, impure copper, and copper alloy scrap is to recover the metals in the alloy in substantially pure form, so that they can be used as such or recombined in a controlled manner to produce a desired copper alloy. Typically, the copper alloy is heated in the presence of oxygen and/or sulfur to produce a mixture of sulfides and/or oxides which can then be chemically separated, the entire copper recovery operation being done generally in accordance with techniques used in smelting of copper-bearing ores.

There are, of course, many other techniques for recovering copper besides smelting, e.g. hydrometallurgy. Much of the knowledge relating to copper recovery in the field of hydrometallurgy has been obtained by working with copper-bearing ores. Typically, copper values are leached from the ore, purified, and then chemically or electrochemically reduced to metallic copper. The first step in a typical hydrometallurgical process is to chemically or electrochemically convert a copper compound to cupric ion or to contact copper-bearing materials with an oxidizing leach solution or roasting followed by leach. Once the copper values are in aqueous solution, a variety of known techniques can be used to obtain pure or substantially pure metallic copper. An offshoot of the hydrometallurgical art relates to the purification of blister copper or other partially purified forms of metallic copper. Blister copper is formed into anodes. The anodes are then electrolyzed to form copper sulfate which is discharged at the cathode as pure copper.

Electrolytic refining (i.e. electrochemical hydrometallurgical purification) of partially purified copper (e.g. copper of less than 98 or 99% by weight purity) and copper alloys has been suggested. The particular technique which has been suggested for this refining process is complex from a theoretical and practical standpoint, but the known chemistry of copper is believed to provide adequate insight into the inherent character of the process steps. Electrolysis takes place in a single fluid cell which is open to the atmosphere. A cuprous chloride electrolyte is fed to the cell. The cell can contain an alloy to be refined as the anode. The copper-depleted electrolyte is recirculated from the cell to tanks for oxidation and reduction reactions which replenish cuprous chloride by means of known chemical reactions between cupric ion and metallic copper (e.g. scrap copper alloys), so that the resulting copper-enriched solution can be used as the aforementioned electrolyte feed. From chemical theory, several things can be deduced or assumed with regard to this copper refining process. First, the extensive oxidation of ions in the cuprous or copper (I) state with oxygen to ions in the copper (II) or cupric state in the presence of chloride ion consumes HCl, and the process is dependent upon addition of considerable amount of replacement acid. Second, oxidation reactions with air can ordinarily take place in the single fluid electrolysis cell, and copper (II) as well as copper (I) would undergo electrolytic reduction to metallic copper at the cathode. Third, on-going chemical reactions between metallic copper and copper (II) exterior to the cell are the key to the ability of this process to furnish an adequate feed of dissolved cuprous chloride to the electrolyte of the electrolysis cell.

SUMMARY OF THE INVENTION

It has now been discovered that electrochemical forces (i.e. the forces of electrodissolution) are adequate to convert impure metallic copper into dissolved ions bearing copper in the cuprous state (e.g. complex cuprous halide ions), provided that the electrodissolution takes place in the presence of 1–14 molar halide ion under non-oxidizing conditions and with proper electrical control. This electrodissolution step does not depend upon or involve a chemical oxidation-reduction reaction or the like involving cupric ion. In operating one-fluid cells according to this invention, it is not necessary to carry out a cuprous to cupric oxidation step either within or external to the cell. This one-fluid cell system is particularly useful for recovering metallic copper from copper alloy scrap, especially when the copper is alloyed with more electropositive metals (Zn, Al, Fe, Ni, Pb, Sn, Mn, Sb, etc.). Two-fluid cells used according to this invention require nonoxidizing conditions in both the catholyte and the anolyte, but oxygen can be allowed to have controlled access to an intermediate zone (e.g. a chamber or holding tank) between the cathode and anode compartments or chambers. This controlled access, where desired, permits some conversion of copper (I)-bearing ions to cupric ions, thereby providing a low potential counter reaction at the cathode to work opposite anodic dissolution thereby balancing the cell. Chemical purification steps can also be carried out in the intermediate zone or in other zones external to the cathode and anode compartments. In both one-fluid and two-fluid cells, the electrolyte is preferably at least 3.25 molar in halide (e.g. chloride or bromide) ion, and the range of 4–12 molar is most efficient in providing copper (I) solubility. Some of the halide ion can be provided by acids (e.g. HCl) and some by ammonium halide, but it is preferred that the electrolyte be at least about 3.0 molar in alkali metal halide or 1.5 molar in alkaline earth metal halide.

In short, this invention involves a round trip from the zero oxidation state through the copper (I) state (and optionally through the copper (II) state also, through oxidation in the intermediate zone) and back to the zero state again. This use of the copper (I) or cuprous state can have advantages over electrolysis requiring a two-electron change from metallic copper to the cupric or copper (II) state at the anode; advantages over a chemical leaching of copper values with aqueous cupric salts can also be obtained. For example, use of the copper (I) state permits lower electricty consumption requirements, lower voltages, lower temperature, and more efficient separation or selective discharge of copper from other metal values at the cathode; also, the catholyte can be substantially depleted of metal values and still be recycled to the anode.

Stated another way, there is no need to provide or regenerate cupric ion in any stage of the process. However, one use of cupric ion in the process is to provide a counter cathodic reaction through the discharge of cupric ion. Even if the catholyte (or the effluent from the cathode chamber in a recirculating system) were to contain no cupric ion, the invention would still function effectively through electrodissolution of copper at the anode.

Virtually any form of impure metallic copper (copper alloys, copper cement, etc.) can be used in two-fluid cells operated according to this invention; however, there is no significant technical advantage over known techniques if the impure copper is more than 99 wt. % pure. This invention is generally intended to avoid or reduce the need for smelting of copper alloy scrap, copper cement, etc., wherein the copper content of the metal or material is relatively low, e.g. 1–99% by weight, more typically 10–95% by weight.

The various embodiments of this invention have in common formation of copper (I)-bearing ions at the anode accompanied by the consumption of about 1.0 faraday of electricity per gram atom of copper thus converted and the discharge of copper-bearing ions at the cathode accompanied by the consumption of about 1.0 (or up to about 2.0) faradays per gram atom of metallic copper thus obtained. The result is purified copper at the cathode at least 99 weight % pure. It is preferred to impress an electromotive force upon the cell to compensate for power losses, overpotential, etc.

In the recovery of copper from alloys according to this invention, there is the possibility of codeposition of other metals at the cathode and also the possibility of inefficient operation due to the build-up of cations of other metals (e.g. zinc, iron, nickel, tin, lead, etc.) A variety of techniques can be used to deal with these possibilities, including the intermediate oxidation step and/or chemical separation steps or other purification steps known to the art. Electrochemical techniques can also be used; for example, the solution can be depleted of copper values (resulting in a constantly increasing voltage at a given current) and the zinc or other relatively electropositive metal values can be recovered by subsequent electrolysis steps.

DEFINITIONS

The technical terminology employed in this specification is generally intended to have the usual art-recognized meaning. However, for further clarity, the following terms are specifically defined.

"Alloyed metallic copper" is intended to denote copper in any of its alloyed states such as solid solutions, intermetallic compounds (including interstitial compounds as well as compounds of fixed chemical composition), and the like. For all practical purposes, these various alloyed states of copper can be considered to be at an oxidation state of zero.

"Copper values" is intended to denote copper in any of its forms, combinations with other elements, states of solution, or oxidation states, and is typically used to refer to compounds, cations, or anions containing copper (I) or copper (II), which compounds or ions can be dissolved in aqueous media (e.g. acidic aqueous solutions of alkali metal halides).

"One-fluid cell" is intended to refer to an electrochemical cell wherein the cathode and the anode are disposed within a single compartment and hence a common or single electrolyte fluid.

"Two-fluid cell" is intended to denote an electrochemical cell in which there is at least one cathode compartment containing a catholyte and at least one anode compartment containing an anolyte. This definition is not intended to require that the catholyte and anolyte be distinctly different fluids; that is, there can be circulation of the anolyte to the catholyte and visa versa. The purpose of the separate electrode chambers, in the context of this invention, is to permit (but not necessarily to require) differences in concentrations of dissolved species as between the regions surrounding the cathode and the anode, although a further purpose can be to exclude a dissolved species from one or the other of these regions.

"Electrolyte contact" refers to the ability of a dissolved ionic species to pass from the anolyte to the catholyte or vice versa. Thus, any of the various regions of the electrolyte in a "one-fluid cell" would be in electrolyte contact by virtue of the ability of dissolved species to migrate or be circulated through the entire body of the electrolyte. Electrolyte contact between two fluid electrolytes can be maintained by any of the techniques or devices known in the art, e.g. dividing the catholyte from the anolyte by means of an ion-permeable membrane or diaphragm or ion exchange membrane.

"External electrical circuit" refers to electrical circuit means for connecting the cathode to the anode external to the electrolyte.

The term "impure metallic copper" includes mixtures of metallic copper with other materials, partially purified copper (e.g. copper cement obtained by conventional cementation techniques), alloyed metallic copper (defined previously), contaminated or impure copper scrap, and the like. Since electrical grade copper is typically more than 99 weight % pure, any type of copper or copper alloy which is less pure can be "impure metallic copper". As is well known and appreciated in the art, the presence of a few percent or less of some impurities can radically alter the electrical properties of copper. However, the major advantages of this invention lie in the recovery of pure (above 99 weight %) copper from substances or mixtures containing less than 98 weight % copper.

The term "aqueous" (as applied to electrolyte media or species dissolved in such media) refers to fluids or states of dissolution in which water is the major solvent and includes water combined with co-solvents and the like.

DETAILED DESCRIPTION

As pointed out previously, this invention involves a round trip from the zero oxidation state of the impure copper through the copper (I) state, then, if desired, through the copper (II) state, and ultimately back to the metallic or zero oxidation state. The purpose of the round trip is to attain a high level of copper purity at the expense of whatever electrical energy which may be needed to overcome power losses inherent in the electrochemical conversion of impure copper to copper (I) and from dissolved copper values back to metallic copper from the Cu(I) state in the most normal preferred operation. The recovery of substantially pure copper in this manner permits recovery or re-use of copper by hydrometallurgical means. That is, the substantially pure copper which is recovered can be used to make copper articles, new copper alloys, substantially pure copper compounds, or any of the common commercial uses of pure copper. The other metals alloyed with the copper (e.g. zinc, lead, tin, etc.) can also be recovered and re-used, either as substantially pure metals or as substantially pure metal compounds. For example, metal values dissolved in the electrolyte can be precipitated as insoluble compounds (including oxides, hydroxides, or salts). These compounds, with no further change of oxidation state, can be converted to the salts commonly used as such, e.g. in electroplating baths, thus eliminating the need for a separate electrolysis step for recovering pure metal in the metallic state. Examples of suitable zinc salt precipitates include zinc sulfide and zinc oxide (which are substantially insoluble in neutral aqueous media), zinc carbonate, zinc chromate, zinc cyanides, zinc oxalate, zinc phosphates, and the like. Similar considerations apply with regard to the recovery of silver, gold, platinum, lead, aluminum, iron, nickel, tin, manganese, and the like. All of these metals except gold, silver, and platinum stand above copper in the electromotive series of metals, and copper (I) or copper (II) would be cathodically discharged in preference to them. These dissolved, relatively electropositive metal values can be either reduced in separate electrolysis steps or precipitated from the electrolyte (either before or after cathodic reduction of copper values) by reaction with suitable water soluble compounds capable of forming substantially water insoluble salts in the presence of the dissolved metal values. Many of the common carbonates, sulfates, sulfides, phosphates, oxides, hydroxides, etc. are sufficiently water insoluble for this purpose.

Noble metals (e.g. Ag, Au, Pd, Pt, etc.) present in the alloy which do not dissolve at the anode can be recovered also by known techniques or can remain at the anode in useable form.

The conversion of alloyed copper to dissolved copper values in the cuprous or copper (I) state is believed to occur through the operation of natural solution driving forces brought to bear through the completion of an external electrical circuit connecting the cathode (which can either be an inert, electrically conductive material or a piece of pure copper) to the effective alloy anode. These forces also tend to precipitate or deposit copper at the cathode. By excluding oxygen (including atmospheric oxygen) from contact with the region of the electrolyte surrounding the anode, the alloyed metallic copper can be electrochemically converted to dissolved cuprous copper values, provided the aqueous electrolyte contains a high concentration of halide ion. For example, the anolyte can be a 1–14 molar solution of an alkali or alkaline earth metal halide. According to generally accepted theories, the halide ions form ionic complexes with copper in the +1 oxidation state, e.g. according to the reaction (simplified for illustration):

(1) $Cu^+ + 2X^- \rightarrow CuX_2^-$ wherein X is the halide ion, and $CuX_2^-$ is a simplified representation of the anion. Complex anions such as $CuX_3^{-2}$, $CuX_4^{-3}$ and $Cu_2X_3^-$ might also exist.

Thus, if sodium chloride is used to solubilize the copper (I) values, the reaction could be considered to be as follows:

(2) $CuCl + NaCl \rightarrow NaCuCl_2$

Assuming the theory is correct, the solubilized cuprous copper values are in the form of anions rather than cations. It can be further assumed that the complex cuprous chloride anions would tend to migrate to the anode rather than the cathode. Accordingly, even in a single-fluid cell of this invention, it is preferred to agitate or circulate the electrolyte. One particularly preferred means for circulating the electrolyte is to pump it through an external re-circulating system, so that fresh electrolyte is always passing by the electrodes and copper values are constantly carried away from the anode. Agitation or circulation can also be induced by ultrasonics.

It is a significant feature of this invention that a chemical leach solution (e.g. an aqueous solution of a cupric salt, a ferric salt, or the like) is not needed to dissolve copper at the anode. In short, the anolyte (or the electrolyte in the region surrounding the anode)

can be substantially free of cupric ion or other extraneous metallic ions having a high oxidation state. In a typical practice of this invention, the anolyte can consist essentially of an acidic or neutral aqueous solution of an alkali metal halide having a pH ranging from about 0 to about 7.5, more typically 0.5–6. As is known in the art, complexing amounts of halides can also be supplied by alkaline earth metal halides (e.g. $CaCl_2$) and, to a lesser extent ammonium halide. Accordingly, after the cuprous halide anions are formed in the anolyte, dissolved copper values can be conveyed to the cathode for reduction of the copper values to metallic copper without regard for the copper concentration or oxidation state in the catholyte which is recirculated to the anode. Even if the catholyte flowing from the cathode chamber were completely depleted of copper values, the alkali metal halide would still be present — and this is all that is needed at the anode. In some of the known processes for recovering copper values from leached ore by electrolysis, and in other analogous prior art processes, it is virtually essential to restore some cupric ion or ferric ion to the effluent from the cathode, so that this effluent can be re-cycled. The present invention, however, does not depend upon a chemical leaching step requiring cupric ion or any metallic ion having an oxidation state higher than +1.

Although this invention is not bound by any theory, it is theorized that the reaction scheme for recovering copper from brasses, bronzes, or similar alloys involves the following equations; wherein Cu(Zn) is used as a model to indicate a typical alloy, X indicats halogen, and e indicates 1.0 faraday of electricity.

In one embodiment of this invention, the reaction scheme is believed to be as follows:

At the anode:

(3) $Cu(Zn) \rightarrow CuX_2^- + Zn^{++} + 3e^-$

At the cathode:

(4) $Zn^{++} + e^- + CuX_2^- \rightarrow Cu^0 + 2X^- + Zn^{++}$

This reaction scheme results in a constantly increasing concentration of zinc ion. This can be countered by electrochemically reducing the zinc in a separate electrolysis step or by precipitating the zinc with base, sodium carbonate, or the like. The halide ion which remains from equation (4) after recovery of the metallic copper and removal of the zinc from the electrolyte (by either chemical or electrochemical means) can be returned to the anode for participation in equation (3).

In another embodiment of this invention, the adverse effects of zinc ion build-up are countered by carrying out equation (3) at the anode and then carrying out the following reaction in a zone intermediate to the anode and cathode chambers:

(5) $2HX + 2CuX_2^- + Zn^{++} + 1/2O_2 \rightarrow 2Cu^{++} + Zn^{++} + 6X^- + H_2O$ At the cathode, then, the following reaction can occur under non-oxidizing conditions (oxygen being admitted in a controlled manner only to the intermediate zone):

(6) $Cu^{++} + Zn^{++} + 2X^- + 2e^- \rightarrow Cu^0 + Zn^{++} + 2X^-$

In this reaction scheme, a one-electron change is believed to occur at the anode, while some two-electron change is believed to occur at the cathode in copper discharge. As in the first embodiment, halide ion from the right hand side of equation (6) can be returned to the anode for participation in equation (3).

In still another embodiment of the invention, the copper values at the cathode are, in a sense, "insulated" from the zinc values by adding acid. As a result, protons must be reduced to hydrogen gas before the zinc cations will be available for discharge. Stated another way, the acid protects the selectivity of discharge at the cathode and gives a counter reaction while the anode reacts. A separate purification zone for removing metal values other than copper can be provided for a one-fluid cell by taking off part of the electrolyte and sending to this separate stage. In this system, make-up electrolyte free of these other metal values is periodically or continually added to the cell.

In a preferred electrochemical cell configuration of this invention, the cell is divided into an anode chamber and a cathode chamber, e.g. by a conventional diaphragm or ion exchange medium or membrane which permits electrolyte contact between the catholyte and the anolyte. In a separate purification stage, which is in liquid communication with both the anode chamber and the cathode chamber, the base, sodium carbonate, or other precipitating agent is added to precipitate zinc salts, lead salts or the like. Sulfate ion is preferred for the precipitation of lead salts. In this complex cell, the purification zone can be an intermediate zone, so that the copper values do not pass from the anode chamber directly to the cathode chamber. Instead, they are circulated through the intermediate purification zone so that other metal values can be removed before the copper values reach the cathode chamber. It is virtually essential that metals less electropositive than copper be removed in this manner.

As is known in the art, the desired electrochemical cell configuration can be connected in series or parallel in a serially divided compartment.

The aforementioned reactions (3) through (6) are different with respect to alloyed metals more noble than copper, e.g. gold, silver, mercury, and the elements of the second and third triads of Group VIII of the Periodic Table. If M represents the "noble" metal, the following reaction can occur at the anode:

(7) $Cu(M) + 2X^- \rightarrow CuX_2^- + e^- + M$

In this case the noble metal precipitates at the anode. Even if the noble metal is dissolved at the anode, it can be recovered by cementation (e.g. with impure copper), electrolytic discharge, and the like. Thus, whatever the copper alloy, the anode reaction can be considered to be:

(8) $Cu + 2X^- \rightarrow CuX_2^- + e^-$

According to the stoichiometry of equation (8), two moles of halide are required for the reaction of 1 mole of copper. In actual practice, at least 3.25 moles (preferably 4–12 moles) of halide are preferred — in other words, at least a 1:1 molar excess over stoichiometry, more preferably a 2–10 molar excess.

The copper containing material used at the anode can be briquetted, or it can be in contact with carbon or other conducting chloride resistant material such as titanium in the form of cup or at the bottom of the cell to assure conductivity. Copper alloy scrap or cement copper can be suspended in a basket or between two porous walls and have conductors immersed in the mass to assure electrical contact. Since the electrolyte preferably is circulated, agitated, or allowed to flow through the anode to assist rapid removal of dissolving metal ion from the anode surface and increased current at a given potential, a fluidized bed anode can be used. The anode can also be horizontal.

The cathode can be carbon, copper, titanium, metal coated with metal oxides, conductive plastics, or other materials known in the art of electrolysis. It can be in the form of solid metal, or a conducting mass between two screens, a set of staggered screens or a maze configuration to give substantial contact together with removal of copper at the highest possible current at a given potential. Various orientations of the cathode can be used, e.g. horizontal or vertical.

The cell (one-fluid or two-fluid) can be operated at normal in-plant ambient temperatures (e.g. 15–35°C.) or at moderately elevated temperatures up to 95°C.

CONTROLLED USE OF OXIDATION

To preserve the copper (I) (i.e. cuprous) state, oxygen can be excluded from contact with both the catholyte and the anolyte (or the single fluid of a single-fluid cell) in this invention. Any of the means known to be effective in excluding oxygen can be used for this purpose, e.g. layers of oxygen-impermeable material on the surface of the electrolyte, a substantially oxygen-free gas blanket (e.g. of nitrogen, argon, or other inert or substantially inert gas), or the like. If residual atmospheric oxygen or dissolved oxygen is still present after the cell has been closed off, the presence of hydrochloric acid at an acid pH of about 4 or lower can be used to consume the residual oxygen by the electrochemical reaction of hydrogen ion and oxygen. In the embodiments of this invention wherein oxygen is allowed to have controlled access to the intermediate zone, air or oxygen gas can be injected into the flow from the anode chamber at a controlled rate. The rate should be slow enough to permit substantially complete reduction of the dissolved oxygen gas to water before delivery to the cathode chamber. Other oxidizing agents such as chlorine gas can be utilized in the intermediate zone in a similar manner.

Alternatively, the catholyte can be discarded or utilized in some manner other than re-circulation to the anode compartment. For example, the catholyte can be sent to a chemical recovery system for the recovery of halide salts or for the reduction of metal-bearing ions to substantially pure metals. In the ordinary or typical use of this invention, however, it will be desirable to continuously re-circulate the electrolyte. This reduces or eliminates the need for make-up alkali metal halide (or other solubilizing halide).

In one preferred use of this invention, for example, the electrolytic cell can be set up in a metal working shop, a scrap shop or scrap yard, or any location where there is an ample supply of copper alloy scrap. In this preferred arrangement, the scrap collector or producer recovers useful metals or metal salts from the scrap himself and need not ship the scrap to smelters. In a typical alloy scrap operation, it would not be unusual to be able to recover, by the teachings of this invention, substantially pure copper, substantially pure gold and silver (e.g. from an anode mud), and substantially pure metal or metal salts of relatively electropositive metals such as zinc, lead, tin, iron, etc.

MODES OF PURIFICATION

To sum up the various modes of purification of the electrolyte medium, with or without controlled oxidation:

a. Closed, one-fluid cell operation can be carried out with minimum addition of make-up electrolyte (e.g. HCl/NaCl water solution) and a minimum of purification (e.g. removal of ions of zinc, lead, tin, aluminum, iron, nickel, manganese, etc. by precipitation). Purification steps can be carried out by periodically removing portions of the aqueous medium in the cell, purifying these portions, and returning them to the cell.

b. Intermediate purification of anode chamber effluent can be carried out in a variety of ways, so that the purified copper values can be sent to the cathode. Treatment of anolyte effluent with base to precipitate oxides or hydroxides is typically followed by a restoration of low pH in the supernatant (e.g. with HCl) prior to transport to the cathode.

C. The effluent from the cathode, after several cycles, of cell operation, can be purified (if desired) and returned to the anode compartment.

d. Noble or precious metals or other metals more noble than copper (e.g. Ag, Au, Pt, Pd, and Hg) can be recovered by a variety of techniques. For the most part, these metals can be recovered from, or simply left behind in, the anode compartment, e.g. as anode muds or slimes or as conductive metal in electrical contact with the anode itself. In accordance with this invention, copper can be selectively electro-dissolved, so that the more noble metals will remain in the metallic state.

In the following non-limiting, illustrative Examples, the purified copper obtained at the cathode was analysed primarily to determine if copper content was above 99% by weight. Since analytical techniques must be carefully refined to detect the difference between 99.5 and 100.0% copper, copper analysis results in these Examples are not intended to indicate the precise level of impurities in the purified copper.

EXAMPLE 1

Electrolysis of Copper, One-Fluid Cell

This experiment demonstrates a one electron process in transfer of copper from anode to cathode in a single-fluid electrolyte. Conditions were: no diaphragm, sodium chloride solution, under nitrogen. By starting out with pure copper and ending up with pure copper, the one-electron change was more readily demonstrated.

The electrolysis solution, per liter, contained 0.94 mols of cuprous chloride and 257g (4.40 mols) of NaCl. With 2 ml. of concentrated hydrochloric acid added to each liter of solution, the solution had a final pH of 0.8.

Two copper electrodes were immersed in an electrolysis cell.

The solution was electrolyzed for 2 hours under nitrogen at a constant current of 1.5 amperes and a voltage of 1.05 volts (initially) to 0.92 volts (finally). This represents a current density of about 3 amperes per decimeter$^2$ (30 ma/cm$^2$ or 30 amps sq. ft.).

The total number of coulombs passed through the solution is 10,800 equivalent to 0.112 mols of copper, 7.12 g., based on a one electron change).

The two electrodes had the following weights.

|  | Initially | After Electrolysis | Change |
|---|---|---|---|
| Anode | 32.83 grams | 25.95 | −6.88g |
| Cathode | 33.30 grams | 40.42 | +7.12g |

The amount of copper deposited on the cathode corresponds to the amount calculated. The amount lost from the anode is within 97% of theory.

EXAMPLE 2

Electrolysis of Yellow Brass

A. Part A of this Example demonstrates direct electrolysis of yellow brass in chloride solution to give good copper with a one electron transfer process and a diaphragm. Significant zinc evidently is not discharged.

The electrodes were an anode of brass 3.5 × 10 centimeters, 197.39 grams, and copper cathode 7 × 8.5cm., 28.39 grams. Both electrodes were immersed to a depth of about 7 centimeters. The cell contained a polypropylene membrane diaphragm and was operated with magnetic stirring on the cathode side under nitrogen. The electrolysis solution was 0.33 molar in cuprous chloride and had 279g. (4.77 molar) of sodium chloride solution. The solution was adjusted with about 2.5 milliliters of hydrochloric acid to give a pH of 1.1. The solution used for electrolysis amounted to 550 milliliters. The Cell was operated with a constant current input of 1 ampere at 0.43–0.49 volts for 4 hours and 12 minutes. This is equivalent to 15,120 coulombs equal to 0.157 mols of electrons. Electrodes were separated by 1.5 inches (3.81 cm) and calculated current density was 20 amperes/sq. foot of cathode.

B. Part B of Example 2 demonstrated build up of copper in catholyte since none was present initially. Brass went into solution in the anode compartment. Copper and acid ion (and presumably zinc) went through the diaphragm. Until copper built up in catholyte, acid ion discharged at cathode to give a counter reaction for the anode where metal dissolves with release of electrons. The copper recovered was analyzed and found to be more than 99% pure.

The catholyte of Example 2(A) was then replaced by about 300 mls. of 4.77 molar aqueous sodium chloride containing one milliliter of concentrated hydrochloric acid, final pH of 1. For 46 minutes the current varied between 0.5 amperes at 0.75 and 0.78 amperes at 0.75 volts with an average of about 0.65 amperes. The current was sensitive to stirring at the cathode. A total of 25 ml of concentrated hydrochloric acid:water, 1:1, was then added to the anolyte. The cell was now run for 5 hours and 18 minutes at 0.5 amperes and a voltage of 0.31 to 0.65, with gassing at the copper electrode. The copper electrode gained in weight only 0.12 grams (28.45–28.33). However the flocculent deposit around it was filtered to give 4.33 grams of more than 99.5+ percent copper (the analysis could not discriminate between 99.5 and 100%). The brass electrode lost 5.79 grams (from the initial weight of 190.16 grams). The current was equivalent to about 11,290 coulombs or 0.117 mols of electrons.

The 5.79 grams brass lost calculates to approximately 0.122 equivalents (based on assumptions given earlier in this example). Presumably hydrogen was discharged at the cathode in this run instead of zinc. The 5.79 gram brass was equivalent to about 3.64 grams of copper based on 63 percent copper content. This provides a means of handling brass during electrolysis. Thus, over a period of time the copper values can go through the diaphragm to catholyte.

Mechanical transfer of copper values to another compartment and then to the cathode chamber was not used in Example 2(B) in order to simplify the evaluation of the data. Such mechanical transfer would ordinarily be preferred, however.

EXAMPLE 3

Direct Electrolysis of Yellow Brass with Diaphragm And Mechanical Transfer of Anolyte One electron transfer purification of copper from brass with rather rapid circulation through anode and cathode compartments was carried out in this Example. The copper recovered was analyzed and reported to be 99.9% pure. The highest current density at the brass electrode was about 87 amperes per square foot. Rapid circulation kept voltage drop across the cell down. A diaphragm was kept across the cell. The electrochemical cell and recirculation apparatus were found to be suitable for use in a purification circuit comprising the catholyte and anolyte chambers (divided from each other by the diaphragm), a conduit from the anolyte chamber to a purification tank (for precipitation of zinc values), a conduit from the purification tank to the catholyte chamber, and a separate reservoir tank in liquid communication with both catholyte and anolyte.

The electrolyte was made up of total volume about 6.8 liters. It contained 6 liters of water, 1728 grams of sodium chloride (29.58 mols), 547 grams of cuprous chloride (5.52 moles), 111.5 grams of zinc chloride (0.81 moles), and about 20 milliliters of concentrated hydrochloric acid. All equipment was operated under a nitrogen atmosphere. In this Experiment it was not necessary to perform any purification in the purification tank which acted only as a reservoir for catholyte. The catholyte and anolyte were contained in a polypropylene electrolysis tank with a capacity of about 1.5 liters, divided into two equal compartments with a non-woven polypropylene fabric diaphragm. Two electrodes were placed opposite each other with two inches of separation.

The yellow brass anode had an initial weight of 466.6 grams and contained about 63 percent copper, 37 percent zinc.

The cathode initially weighed 160.5 g.

Both electrodes were immersed in electrolyte to a depth of 15 cm. Solution was circulated through the system by pumping and gravity flow at more than one liter per minute. The solution was electrolyzed over a period of 1 hour 15 minutes at varying voltages and current with values as shown for various voltage settings.

| Voltage (Volts) | Current (Amps) | Anode Current Density (amp/ft²) | Cathode Current Density (amp/ft²) |
|---|---|---|---|
| 0.9 | 5 | 87 | 30 |
| 0.6 | 4 | 70 | — |
| 0.45 | 3 | — | — |
| 0.29 | 2 | 35 | 12 |

During the period of electrolysis, an estimated 17,210 coulombs was passed through the cell. This was equivalent to a calculated amount of copper of 11.65g.

The amount of copper obtained from the cathode was 12.01 grams of 99.9% purity (most accurate analysis available). The active cathode current density was about twelve to thirty amperes per square foot. The current density at the anode was about 35 to 87 amperes per square foot. The brass anode lost about nine grams in weight.

EXAMPLE 4

Direct Electrolysis of Copper Cement Containing Iron

This experiment demonstrates direct electrolysis of copper cement (obtained from a commercial source) in sodium chloride solution to give good copper. The efficiency was 71% based on one electron transfer. The recovered copper was essentially 99+% pure (best available analysis). No diaphragm was used.

Electrolysis solution was 4.78 molar in sodium chloride, 0.51 in cuprous chloride and adjusted to pH of 1.5 by adding about one milliliter of hydrochloric acid to each liter.

About 600 ml of the clear solution above was placed in an electrolysis cell with no diaphragm. The 4 × 10 centimeter copper cathode, 0.021 inches thick, was immersed to a depth of 7 centimeters. It was placed opposite a graphite cup containing 20g. of cement (78.1% copper, 21.9% iron). The cell was operated with stirring under nitrogen. The cell was operated at a current of 0.4 amperes for a total of 3 hours and twelve minutes with a voltage drop of 0.65 to 0.72V and at a current of 0.2 amperes with an impressed voltage of 0.58 volts for 1 hour and 58 minutes. (Current density was 16 amp/ft$^2$.) This gave a total of about 6000 coulombs or about 0.062 mols of current on the basis of a one electron change (equivalent to 3.94 grams of copper). The copper electrode went from 13.96 to 16.72 grams (2.76 grams). The analysis of the purified copper indicated substantially 100% pure copper. No attempt was made to analyze for specific impurities.

What is claimed is:

1. A method for electrochemical hydrometallurgical recovery of metallic copper from impure metallic copper, said metod comprising the steps of:
   a. using said impure metallic copper as the anode in an electrolytic cell containing a cathode, a cathode compartment, an external electrical circuit means for connecting said cathode to the impure metallic copper anode, and anode compartment, an aqueous anolyte in said anode compartment and an aqueous catholyte in said cathode compartment, both said catholyte and anolyte being maintained substantially free of dissolved oxygen gas, having a pH less than about 7.5, and being about 1–14 molar with respect to water soluble ammonium halide salt ot water soluble halide salt of a metal which is more electropositive than copper; said impure metallic copper containing a second metal which is in the metallic state;
   b. electrochemically converting impure metallic copper in said anode into complex ions containing copper in the cuprous state, whereby copper in said anode passes into said anolyte as said complex ions by the action of electrodissolution, said converting step being accompanied by the transfer, from said alloyed metallic copper to said electrical circuit means, of about 1.0 faraday of electricity for each gram atom of copper converted to said complex ion;
   c. excluding access of oxygen gas to said aqueous anolyte, whereby the copper in said cuprous state in said complex ions is maintained in said cuprous state, at least in said anolyte;
   d. transferring copper-containing ions obtained in said anolyte to said catholyte;
   e. electrochemically converting said copper-containing ions to substantially pure metallic copper at said cathode by consuming from about 1.0 to about 2.0 faradays of electricity for each gram atom of copper obtained; and
   f. recovering the substantially pure metallic copper obtained by said step (e).

2. A method according to claim 1 wherein said anolyte is circulated to said cathode compartment to commingle with said catholyte.

3. A method according to claim 2 wherein said anolyte is passed through a purification zone before being circulated to said cathode compartment.

4. A method according to claim 2 wherein said anolyte is passed through a controlled oxidation zone prior to being circulated to said cathode compartment.

5. A method according to claim 1 wherein said anolyte and catholyte are essentially chemically identical fluids which are in electrolyte contact through an ion-permeable dividing medium.

6. A method according to claim 2 wherein said catholyte is circulated back to said anode compartment.

7. A method according to claim 1 wherein said impure metallic copper comprises 1–98% by weight metallic copper, and wherein said electrolytic cell is operated at a temperature of 15°–95°C.

8. A method according to claim 7 wherein said impure metallic copper is an alloy of copper and at least a second metal which is more electropositive than copper.

9. A method according to claim 1 wherein said substantially pure metallic copper obtained from said cathode, without any further refinement or purification, is greater than 99% by weight pure copper.

10. A method according to claim 1 wherein the aqueous electrolyte is mechanically stirred by continuous circulation through an electrolyte re-circulating system from which air is excluded.

11. A method according to claim 1 wherein said anolyte contains chloride ion in a concentration of at least 3.25 molar.

12. A method according to claim 1 wherein said impure metallic copper is an alloy of copper and at least a second metal which is more noble than copper, and wherein the more noble metal is recovered from said anode compartment.

13. A method according to claim 1 wherein said water soluble ammonium halide salt or water soluble halide salt of a metal which is more electropositive than copper is selected from the group consisting of chloride and bromide.

14. A method for hydrometallurgical recovery of metallic copper from alloy scrap containing alloyed metallic copper and at least a second metal, said method comprising the steps of:
   a. using said alloy scrap as the anode in an electrolytic cell containing a cathode, an external electrical circuit means for connecting said cathode to the resulting alloy scrap anode, and an aqueous electrolyte in contact with both said alloy scrap anode and said cathode, said aqueous electrolyte being maintained substantially free of dissolved oxygen gas, having a pH less than about 7, and being about 1.0–14 molar with respect to water soluble ammonium halide or a halide salt of a metal which is more electropositive than copper;

b. electrochemically converting alloyed copper in said alloy scrap, at said alloy scrap anode, into water soluble complex ions containing copper in the cuprous state, whereby said copper in said alloy scrap is introduced into said aqueous electrolyte as said water soluble complex ions through the action of electrodissolution, said converting step being accompanied by the transfer, from said alloyed metallic copper to said electrical circuit means, of about 1.0 faraday of electricity for each gram atom of copper converted to said complex ion;

c. preventing access of oxygen gas to said aqueous electrolyte during said step (b), whereby the copper in said cuprous state in said complex ions is maintained in said cuprous state;

d. circulating said water soluble complex ions produced in step (b) by agitation of said aqueous electrolyte to provide continual motion of aqueous electrolyte containing said water soluble complex ions at least in the region of said electrolyte surrounding said cathode and said anode;

e. electrochemically converting copper-containing ions resulting from step (b) to substantially pure metallic copper at said cathode by consuming about 1.0 faraday of electricity for each gram atom of copper obtained; and f. recovering the substantially pure metallic copper obtained by said step (e).

15. A method according to claim 14 wherein said second metal is a metal which is more electropositive than copper.

16. A method according to claim 14 wherein said second metal is zinc.

17. A method according to claim 12 wherein said second metal is more noble than copper.

18. A process according to claim 14 wherein said water soluble ammonium halide or halide salt of a metal which is more electropositive than copper is selected from the group consisting of chloride and bromide.

19. A method for hydrometallurgical recovery of copper from alloy scrap containing metallic copper alloyed with metallic zinc, said method comprising the steps of:

a. providing an electrolytic cell comprising:
 i. said alloy scrap as the anode;
 ii. a 1.25–10 molar excess over stoichiometry of aqueous halide ion as the anolyte for said electrochemical cell, said anolyte being substantially free of dissolved oxygen gas and cupric ion and having a pH ranging from 0 to 7.0;
 iii. a cathode in contact with a catholyte, said catholyte being in electrolyte contact with said anolyte;
 iv. an external electrical circuit connecting said cathode to said anode;

b. under chemically non-oxidizing conditions, electrochemically converting metallic copper in said anode to a dissolved aqueous ionic copper (I) halide complex by electrodissolution, accompanied by the transfer, from said metallic copper to said external electrical circuit of about 1.0 faraday of electricity for each equivalent of copper (I) obtained thereby, said dissolved aqueous ionic copper (I) halide being dissolved in said anolyte;

c. simultaneously with said step (b), electrochemically converting metallic zinc in said anode to zinc cations, accompanied by the transfer, from said metallic zinc to said external electrical circuit, of about 2.0 faradays of electricity for each equivalent of zinc cation obtained thereby:

d. conveying said dissolved aqueous ionic copper (I) halide to said catholyte, thereby introducing dissolved copper values into said catholyte;

e. maintaining the copper of said ionic copper (I) halide complex in the copper (I) state by exclusion of atmospheric oxygen from said anolyte and said catholyte;

f. electrochemically converting said dissolved copper values in said catholyte to metallic copper of at least about 99 weight % purity;

g. repeatedly removing said metallic copper of at least about 99 weight % purity from said electrolytic cell and repeatedly adding more alloy scrap containing metallic copper to said anode; and h. circulating said catholyte back to said anode for re-use as anolyte.

20. A process according to claim 15 wherein said acqueous halide ion is selected from the group consisting of chloride and bromide.

* * * * *